United States Patent [19]

Spindler et al.

[11] 4,391,988

[45] Jul. 5, 1983

[54] PROCESS FOR THE PRODUCTION OF AQUEOUS SODIUM METHIONINATE SOLUTIONS

[75] Inventors: Manfred Spindler; Herbert Tanner, both of Hanau; Friedhelm Geiger, Erlensee; Friedrich Bittner, Bad Soden; Jurgen Martens, Alzenau, all of Fed. Rep. of Germany

[73] Assignee: Degussa Aktiengesellschaft, Frankfurt am Main, Fed. Rep. of Germany

[21] Appl. No.: 347,476

[22] Filed: Feb. 10, 1982

[30] Foreign Application Priority Data

Dec. 2, 1981 [DE]  Fed. Rep. of Germany ....... 3104997

[51] Int. Cl.$^3$ .......................................... C07C 149/247
[52] U.S. Cl. ................................. 562/559; 562/554
[58] Field of Search ...................... 562/554, 575, 559

[56] References Cited

U.S. PATENT DOCUMENTS

| | | | |
|---|---|---|---|
| 2,557,920 | 6/1951 | White | 562/559 |
| 2,642,459 | 6/1953 | White | 562/559 |
| 3,636,098 | 1/1972 | Shima | 562/559 |

FOREIGN PATENT DOCUMENTS 49-1515  1/1974  Japan .................................. 562/554

OTHER PUBLICATIONS

Hill, Biochem. J., 28, pp. 1008-1013, (1934).
Hougen, "Chemical Process Principles", 2nd Ed., pp. 146-159, (1954).
CRC Handbook of Chemistry and Physics", 46th Ed., p. B-222, (1966).

*Primary Examiner*—Michael L. Shippen
*Attorney, Agent, or Firm*—Cushman, Darby & Cushman

[57] ABSTRACT

Aqueous sodium methioninate solutions having a low content of sodium carbonate can be recovered from the crude hydrolysis mixture resulting from the saponification of 5-(β-methylmercaptoethyl)-hydantoin with 1.1 to 6 equivalents of sodium hydroxide and/or sodium carbonate by distilling off the water from the crude hydrolysis mixture until the sodium methioninate content is 40 to 65 weight percent, and after cooling to at most room temperature separating off the precipitated sodium carbonate.

6 Claims, No Drawings

PROCESS FOR THE PRODUCTION OF AQUEOUS SODIUM METHIONINATE SOLUTIONS

BACKGROUND OF THE INVENTION

The invention is directed to a process for the production of aqueous sodium methioninate solutions having a low content of sodium carbonate from the crude hydrolysis mixtures resulting from the saponification of 5-($\beta$-methylmercaptoethyl)-hydantoin with 1.1 to 6 equivalents of sodium hydroxide and/or sodium carbonate.

The essential aminoacid methionine for a long time to a considerable extent has been produced synthetically and used as a feed additive, especially in industrially produced mixed feeds for birds, swine, and other agriculturally useful animals. However, problems occur in storing and processing the methionine. From the very beginning methionine present in crystalline form is not pourable and can cake during storage if this is not avoided through suitable expensive crystallization conditions. If the methionine is present in powder form, in a given case with an addition of an additive preserving pourability, then there exists the problems of dust formation occurring in the handling of all powdery materials.

A further point is the exact dosaging and homogeneous distribution of solid methionine in mixed feeds. In the supplementation of mixed with methionine there are used low concentrations of the order of magnitude of about 0.01 to 1.0 weight percent. In order to guarantee a homogeneous distribution, there is unavoidable the production of a special premixture containing methionine in correspondingly higher concentration.

In place of solid methionine in more advantageous manner there can be employed a liquid formulation. Liquids can be dosed exactly and homogeneously mixed with other components of the mixture present in the desired concentrations by spraying.

Since free methionine is only slightly soluble in water, there are better suited for the requirements of practice salts having good water solubility, especially sodium methioninate. Now there are indeed necessarily formed aqueous solutions of sodium methioninate if there is saponified an aqueous solution of 5-($\beta$-methylmercaptoethyl)hydantoin with 1.1 to 6 equivalents of sodium hydroxide and/or sodium carbonate in a known and frequently used process for the production of DL-methionine. This crude hydrolysis mixture, however, likewise necessarily contains also a more or less large amount of sodium carbonate, in general at least one half to one mole per mole of sodium methioninate. This sodium carbonate is undesired as a foreign salt in the production of mixed feeds.

Furthermore, moreover, it is inclined to partially crystallize out in long storage so that the crude hydrolysis mixtures are not storage stable. It would naturally be possible without further to isolate the methionine from the crude hydrolysis mixtures in known manner and to then subsequently dissolve the methionine in aqueous sodium hydroxide to a sodium methioninate solution. However, it would be simpler and above all, more favorable cost wise if there could be separated from the crude hydrolysis mixture at least the greatest part of the sodium carbonate contained therein. Prevously, however, there was not known a process for the separation of sodium methioninate and sodium carbonate.

BRIEF DESCRIPTION OF THE INVENTION

The process of the invention is characterized by distilling off water from the crude hydrolysis mixture until the sodium methioninate content is 40 to 65 weight percent and after cooling to a temperature which is at most room temperature separating off the precipitated sodium carbonate.

Surprisingly in the concentration of the aqueous solution there does not precipitate out the expected sodium salt of the poorly soluble organic acid methionine but sodium carbonate, a typical inorganic hydrophilic substance. The thus recovered sodium methioninate solutions of relatively high concentration contain only small residual amounts of sodium carbonate, in the normal case, less than 3 weight percent. They also are storage stable at low temperatures over a long time and do not deposit any solids.

A still further separation of the sodium carbonate can be attained by cooling the concentrated hydrolysis mixture before the separation of the sodium carbonate to a temperature between 0° and 5° C. In this case the residual content of sodium carbonate generally falls below 1 weight percent.

The distillation of the water can take place in all the customarily used apparatuses for the concentration of aqueous solutions, in the simplest case in a stirred kettle with a condensate condenser erected thereon, the separation of the precipitated sodium carbonate can be carried out in all the customary apparatus for the separation of solids from liquids, such as filters or centrifuges.

The content of sodium methioninate in the hydrolysis mixture in each case during the concentration can be determined in a simple manner by titration with bromide/bromate, the residual content of sodium carbonate after its separation by volumetric gas $CO_2$-determination.

Suitably in the process of the invention there are employed crude hydrolysis mixtures which are obtained in the saponification of 10 to 45 weight percent aqueous solutions of 5-($\beta$-methylmercaptoethyl)-hydantoin.

The aqueous solutions of sodium methioninate produced according to the process of the invention in their use as feed additives have the same methionine effectiveness as solid methionine insofar as they are employed in equimolar amounts.

As liquid formulations in the supplementation of mixed feeds with methionine they do not require the production of special premixtures containing methionine in correspondingly higher concentration. Rather they can be homogeneously mixed in directly in the concentrations provided for through spraying into a mixing chamber with the remaining components of the mixed feed already present in the desired concentration.

The process of the invention is explained in more detail in the following examples. All percentage given are percent by weight.

The process can comprise, consist essentially of, or consist of the stated steps with the recited materials.

EXAMPLE 1

There were employed 1000 ml of a crude hydrolysis mixture which was produced by saponification of a 35% aqueous solution of 5-($\beta$-methylmercaptoethyl)-hydantoin with 2 equivalents of sodium hydroxide (as a 50% solution) at 170° C. with removal of carbon dioxide and ammonia from the reaction mixture and contained 302.9 grams of sodium methioninate and 93.8 grams of sodium carbonate and had a density of 1.19 g/cm$^3$.

There were distilled off from this crude hydrolysis mixture 300 ml of water. After cooling to room temperature the precipitate formed was separated off via a suction filter. The filtrate contained 42% of sodium methioninate and only 2.9% of sodium carbonate.

EXAMPLE 2

Example 1 was repeated with the difference that before the filtration the precipitate formed was cooled to 5° C. The filtrate contained 47% sodium methioninate and only 0.9% sodium carbonate.

EXAMPLE 3

Example 1 was repeated with the difference that 450 ml of water was distilled off. After cooling to 0° C. the precipitate formed was separated off via a suction filter. The filtrate contained 54% sodium methioninate and only 0.9% sodium carbonate.

EXAMPLE 4

There were employed 1000 ml of a crude hydrolysis mixture which was produced by saponification of a 10% aqueous solution of 5-(β-methylmercaptoethyl)-hydantoin with 2 equivalents of sodium hydroxide (as a 50% solution) at 170° C. with removal of carbon dioxide and ammonia from the reaction mixture and contained 9% sodium methioninate and 3% sodium carbonate and had a density of 1.06 g/cm$^3$.

There were distilled off from the crude hydrolysis mixture 850 ml of water. After cooling to room temperature the precipitate formed was filtered off via a suction filter. The filtrate contained 57% sodium methioninate and only 2.1% sodium carbonate.

EXAMPLE 5

There were employed 800 ml of a crude hydrolysis mixture which was produced by saponification of a 45% aqueous solution of 5-(β-methylmercaptoethyl)-hydantoin with 2 equivalents of sodium hydroxide (as a 50% solution) at 170° C. with removal of carbon dioxide and ammonia from the reaction mixture and contained 31% sodium methioninate and 10% sodium carbonate and had a density of 1.20 g/cm$^3$.

There were distilled off from this crude hydrolysis mixture 260 ml of water. After cooling to room temperature the precipitate formed was filtered off via a suction filter. The filtrate contained 49% sodium methioninate and only 2.3% sodium carbonate.

What is claimed is:

1. A process for the production of an aqueous sodium methioninate solution having a low content of sodium carbonate comprising forming a crude aqueous hydrolysis mixture by the saponification of 5-(β-methylmercaptoethyl)-hydantoin with 1.1 to 6 equivalents of sodium hydroxide, sodium carbonate, or a mixture of sodium hydroxide and sodium carbonate, distilling off water from the crude hydrolysis mixture until the sodium methioninate content is 40 to 65 weight percent, cooling to a temperature which is at most room temperature and then separating off the precipitated sodium carbonate.

2. A process according to claim 1 including the step of cooling the concentrated hydrolysis mixture prior to the separation of sodium carbonate to a temperature between 0° and 5° C.

3. A process according to claim 2 wherein the saponification is carried out with sodium hydroxide.

4. A process according to claim 1 wherein the saponification is carried out with sodium hydroxide.

5. A process according to claim 1 consisting of the recited steps employing the recited materials.

6. A process according to claim 2 consisting of the recited steps employing the recited materials.

* * * * *